United States Patent

Kooiker

[11] Patent Number: 5,860,604
[45] Date of Patent: Jan. 19, 1999

[54] MOTORIZED FERTILIZER SPREADER

[75] Inventor: Kenneth Kooiker, Holland, Mich.

[73] Assignees: Doug Slenk; Jon Heethuis, both of Holland, Mich.

[21] Appl. No.: 752,710

[22] Filed: Nov. 19, 1996

[51] Int. Cl.$^6$ .............................. A01C 17/00; A01C 19/00
[52] U.S. Cl. ........................ 239/684; 239/670; 239/672; 239/683; 239/685
[58] Field of Search .................................. 239/670, 672, 239/680, 681, 683, 684, 685

[56] References Cited

U.S. PATENT DOCUMENTS

| | | | |
|---|---|---|---|
| 3,322,429 | 5/1967 | Cervelli | 239/670 |
| 3,420,452 | 1/1969 | Vaughan | 239/670 |
| 3,848,772 | 11/1974 | Aanestad et al. | 222/145 |
| 3,951,312 | 4/1976 | Gay | 239/685 X |
| 4,234,131 | 11/1980 | Baker | 239/685 |
| 4,352,463 | 10/1982 | Baker | 239/663 |
| 4,700,895 | 10/1987 | Takata | 239/670 |
| 5,333,795 | 8/1994 | Jessen | 239/685 X |
| 5,385,306 | 1/1995 | Cervenka | 239/663 |
| 5,485,963 | 1/1996 | Walto et al. | 239/663 |
| 5,533,676 | 7/1996 | Conley | 239/681 X |

Primary Examiner—Kevin P. Shaver
Assistant Examiner—Robin O. Evans
Attorney, Agent, or Firm—Van Dyke, Gardner, Linn & Burkhart LLP

[57] ABSTRACT

A motorized spreader for dispersing granular and other material, such as fertilizer, seed, and salt, or the like, provides improved uniform control of the flow of the material from the spreader. The motorized spreader includes a frame and drive train supporting the frame. A hopper for holding granular material is also supported on the frame and includes a dispensing opening for directing the flow of granular material from the hopper onto the ground. An agitator is positioned in the hopper for urging the granular material in the hopper toward the dispensing opening so that the flow of the granular material from the hopper is controlled. The drive train includes first and second wheels, with each wheel including an axle. A differential drivingly couples the axles of the wheels together and includes a first drive sprocket and a second drive sprocket, the first drive sprocket coupling to a motor to drive the motorized spreader at a ground speed. The second drive sprocket couples to the agitator for driving the agitator so that the rotational speed of the agitator is proportional to the ground speed of the motorized spreader for regulating the flow of the granular material through the dispensing opening.

25 Claims, 4 Drawing Sheets

MOTORIZED FERTILIZER SPREADER

TECHNICAL FIELD AND BACKGROUND OF THE INVENTION

The present invention relates to a motorized spreader especially suited for spreading fertilizer, salt, and seed or the like and in particular to the drive train for the motorized spreader.

In conventional motorized fertilizer spreaders, the spreader includes a hopper for holding fertilizer and a hopper support frame. The support frame is mounted onto a set of wheels, which are mounted onto a drive axle and driven by a motor. The hopper may include one or more dispensing apertures through which the fertilizer is dispensed—in other words, the hopper operates on a gravity feed system.

In recent developments, augers have been positioned in the hopper to improve the control of the flow of the fertilizer from the hopper. In some applications, the auger is drivingly coupled to one of the wheels so that when the spreader is driven forward the auger rotates at a speed proportional to the wheel speed to dispense the fertilizer in the hopper onto the ground. When the spreader is being driven forward in a generally straight path, the fertilizer is dispensed relatively uniformly. However, when the spreader is turned, the speed of the auger will either increase or decrease depending on which wheel the auger is coupled. It will be understood for example that if the auger is coupled to the right forward wheel and the spreader is turned to the right, then the right wheel's speed will decrease and so too will the speed of the auger. This results in a reduced amount of fertilizer being dispensed from the hopper without a reduction in the area to be covered by the spreader and, consequently, results in a non-uniform distribution of the fertilizer onto the ground.

Other proposed fertilizer spreaders drivingly couple an impeller blade to the drive axle of a motorized spreader. For example, in U.S. Pat. No. 4,352,463 to Baker, a treatment spreader (10) includes a hopper (16) having a plurality of metering holes (17), (18), and (19). An impeller blade (40), which is carried on a vertical shaft (39), is supported below metering holes (17), (18), and (19). The vertical shaft (39) is meshed with a bevel gear (66), which is centrally located on the drive axle of the spreader so that rotation of the drive axle imparts rotating to the impeller blade (40). While the rotation of the impeller is controlled by the rotation of the drive axle, the flow of the fertilizer from the hopper through the metering holes is not correlated to the ground speed of the spreader. Instead, the flow of the fertilizer is controlled by the operator of the spreader through a lever (25) and a rod (30). While the uniformity of the fertilizer distribution is improved, the control of the fertilizer is within the discretion of the operator and, therefore, is subject to variation.

SUMMARY OF THE INVENTION

Accordingly, the present invention provides a new and unique motorized spreader, especially suited for spreading granular and other material, such as fertilizer, seed, salt, or the like, which includes an improved drive train to correlate the speed of an auger, which controls the flow of the material from a hopper, to the ground speed of the spreader. In this manner, uniform distribution of the material is achieved on the ground since the flow of the material from the hopper is directly proportional to the ground speed of the spreader.

According to one aspect of the invention, a motorized spreader includes a frame and a drive train supporting the frame. A hopper for holding granular material is also supported on the frame and includes a dispensing opening for directing the flow of granular material from the hopper onto the ground. An agitator is positioned in the hopper for urging the granular material in the hopper toward the dispensing opening so that the flow of the granular material from the hopper is controlled. The drive train includes first and second wheels, with each wheel including an axle. A differential drivingly couples the axles of the wheels together and includes a first drive sprocket and a second drive sprocket, the first drive sprocket coupling to a motor to drive the motorized spreader at a ground speed. The second drive sprocket couples to the agitator for rotating the agitator so that the rotational speed of the agitator is proportional to the ground speed of the motorized spreader. Hence the flow of the granular material is regulated through the dispensing opening and maintained at a rate that is proportional to the ground speed of the spreader regardless of whether the spreader is moved in a curved or rectilinear path.

The agitator may comprise an auger. The auger includes a shaft and a helical rib projecting from and extending along the shaft for pushing the granular material toward the dispensing opening of the hopper. The auger may also include a drive sprocket and an endless chain for coupling the auger to the drive train. The drive sprocket of the auger may comprise a multiple speed drive sprocket such that the speed of auger is variably proportional to the ground speed of the motorized spreader.

According to another aspect of the invention, a motorized spreader includes a frame having a handle and a platform. A hopper for holding granular material is supported by the frame and includes a dispensing opening. An impeller is supported below the dispensing opening and is adapted to be driven for dispersing the granular material as it flows through the dispensing opening of the hopper. An auger is positioned in and rotatably supported by the hopper, with the auger positioned for urging the granular material in the hopper toward the dispensing opening. A pair of wheels, each having a drive axle, are mounted to the frame. A motor is supported by the frame and includes a motor drive sprocket for driving the motorized spreader at a ground speed. The wheel axles are coupled by a differential, which is coupled to the motor drive sprocket and to the auger through a gear set for rotating the auger at a rotational speed proportional to the ground speed of the spreader. The gear set may comprise a right angle gear box having an input drive sprocket coupling to the differential and an output sprocket coupling to the auger. In this manner, the flow of the material from the hopper is maintained regardless of whether the spreader is moving in a curvilinear path or in a rectilinear path.

According to yet another aspect of the invention, a method of controlling the flow of granular material from a motorized spreader includes the steps of rotatably supporting an auger in the hopper of a spreader and positioning the auger to urge the granular material in the hopper toward the dispensing opening of the hopper. By coupling the axles of the spreader's wheels with a differential and coupling the auger to the differential through a right angle gear set, the auger is driven at a rotational speed proportional to the ground speed of the vehicle to uniformly dispense the material from the hopper regardless of the heading of the spreader.

As will be understood, the motorized spreader of the present invention provides several advantages over the prior known spreaders used for dispensing fertilizer, seed, and salt. The motorized spreader overcomes the lack of uniformity of material being dispensed that is exhibited with prior known spreaders, which couple the auger to one of the wheels. The rotational speed of the auger in the present invention is controlled by a differential, which couples the auger through a gear set to the motor so that the rotational speed of the auger is independent of the wheels' rotation and instead is directly proportional to the ground speed of the spreader. The differential eliminates the effect of the increase or decrease in the wheel speed while the spreader is turning. Furthermore, by using the ground speed as the driving speed for the auger, the rotational speed of the auger may be varied by simply increasing or decreasing the ground speed or by adjusting the gear ratio between the auger and the motor.

These and other objects, advantages, purposes, and features of the invention will become more apparent from the study of the following description taken in conjunction with the drawings.

DESCRIPTION OF THE PREFERRED EMBODIMENTS

Figure 1:
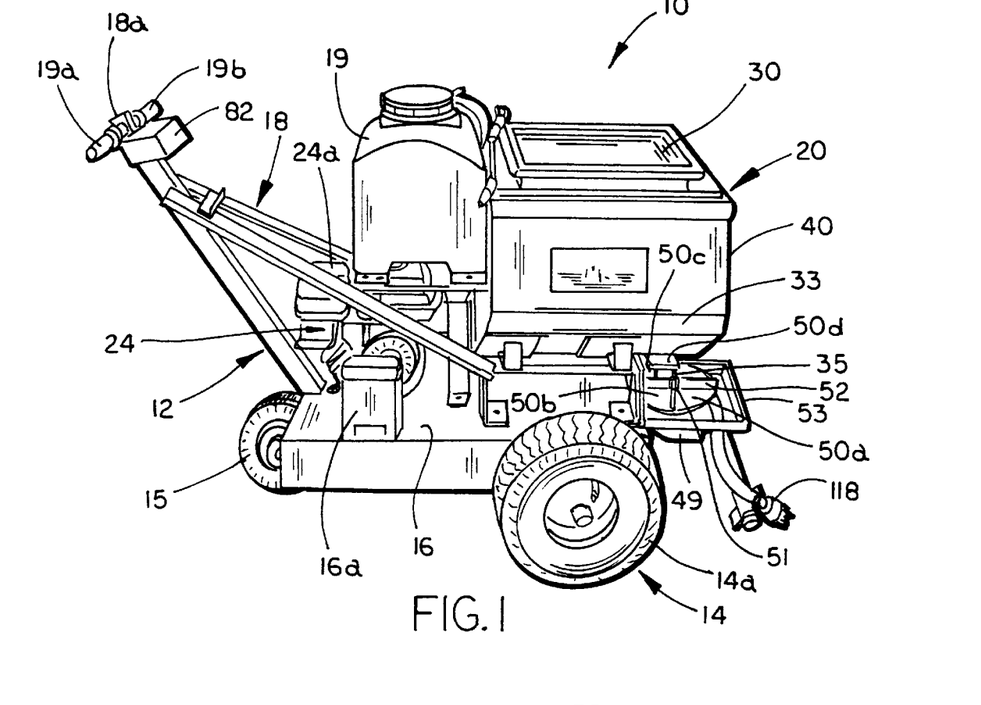
FIG. 1 is a first perspective view of a motorized spreader of the present invention.
Figure 2:
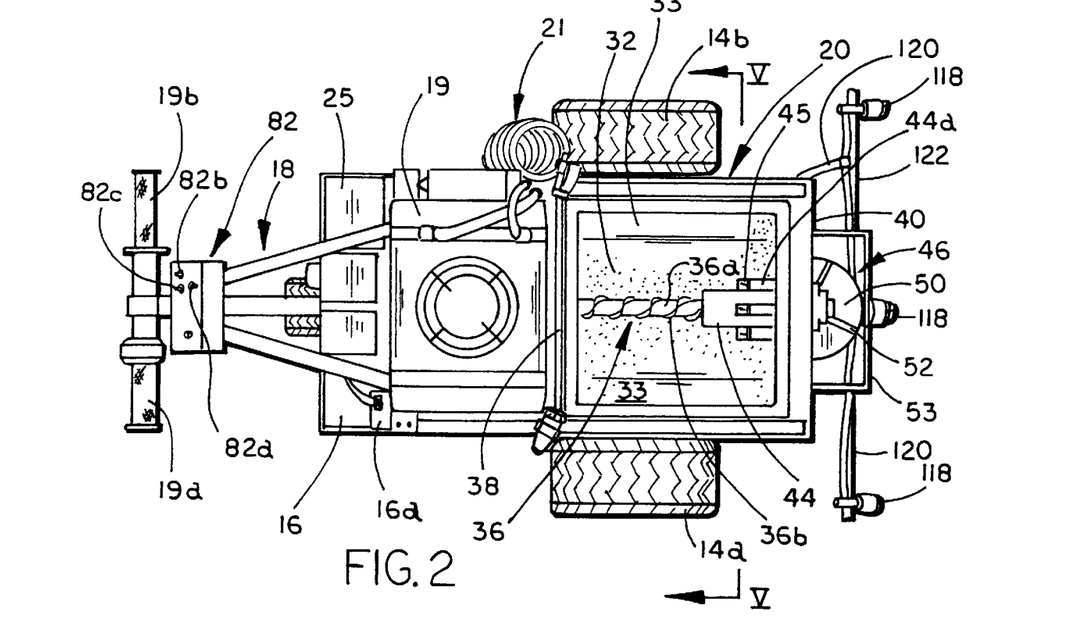
FIG. 2 is a top plan view of the motorized spreader of FIG. 1 illustrating the position of the auger in the hopper of the spreader.

Referring to FIGS. 1 and 2, the numeral 10 designates a motorized spreader of the present invention. The motorized spreader 10 includes a frame 12, which is supported on a drive train 14 and a rearward swivel wheel 15. Frame 12 includes a base 16 and a pusher arm 18 with a pair of handles 19a and 19b mounted to a distal end portion 18a of pusher arm 18 for controlling the direction of the spreader 10, with handle 19a comprising a twist throttle handle, as will be explained below. Base 16 supports a fluid holding tank 19 and a hopper 20, which holds a material, such as fertilizer, salt, seed, or the like that is to be dispersed by spreader 10 onto a ground surface, such as a lawn or the like. Tank 19 is provided for holding a fluid, such as water or the like, for spraying the treated or seeded ground with the fluid in tank 19 through a spray system 21.

Figure 3:
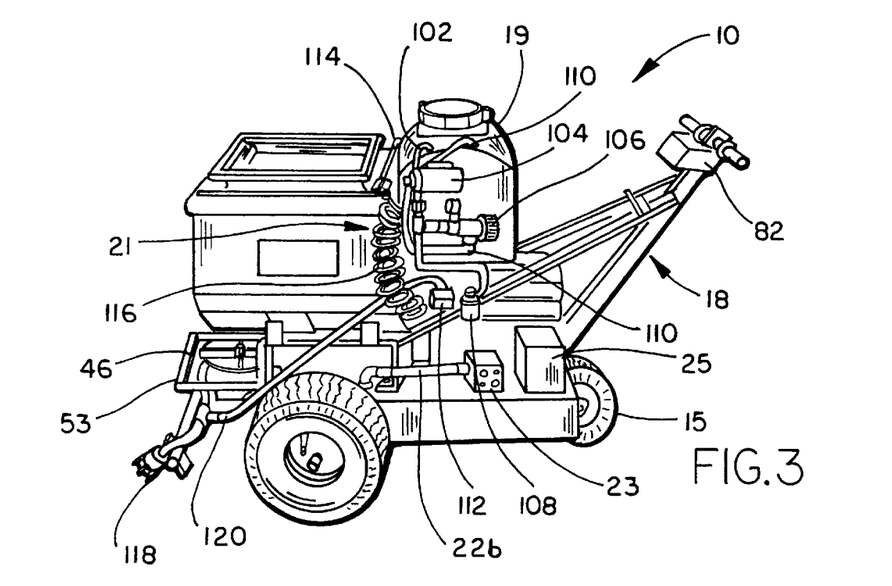
FIG. 3 is a second perspective view of the motorized spreader illustrating a spray system.
Figure 6:
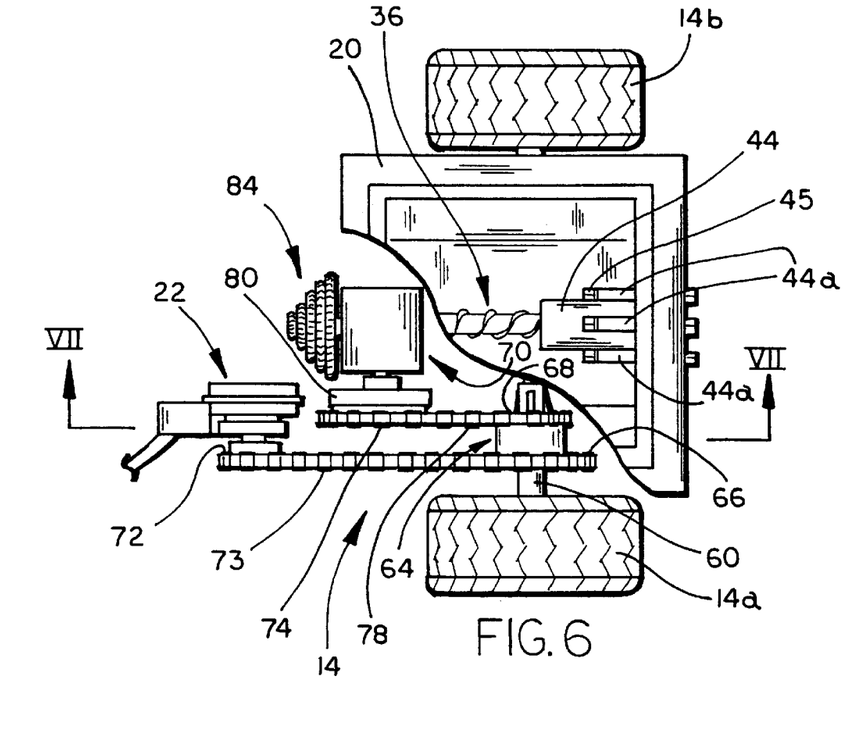
FIG. 6 is a cut-away top plan view of the drive train of the motorized spreader.
Figure 8:
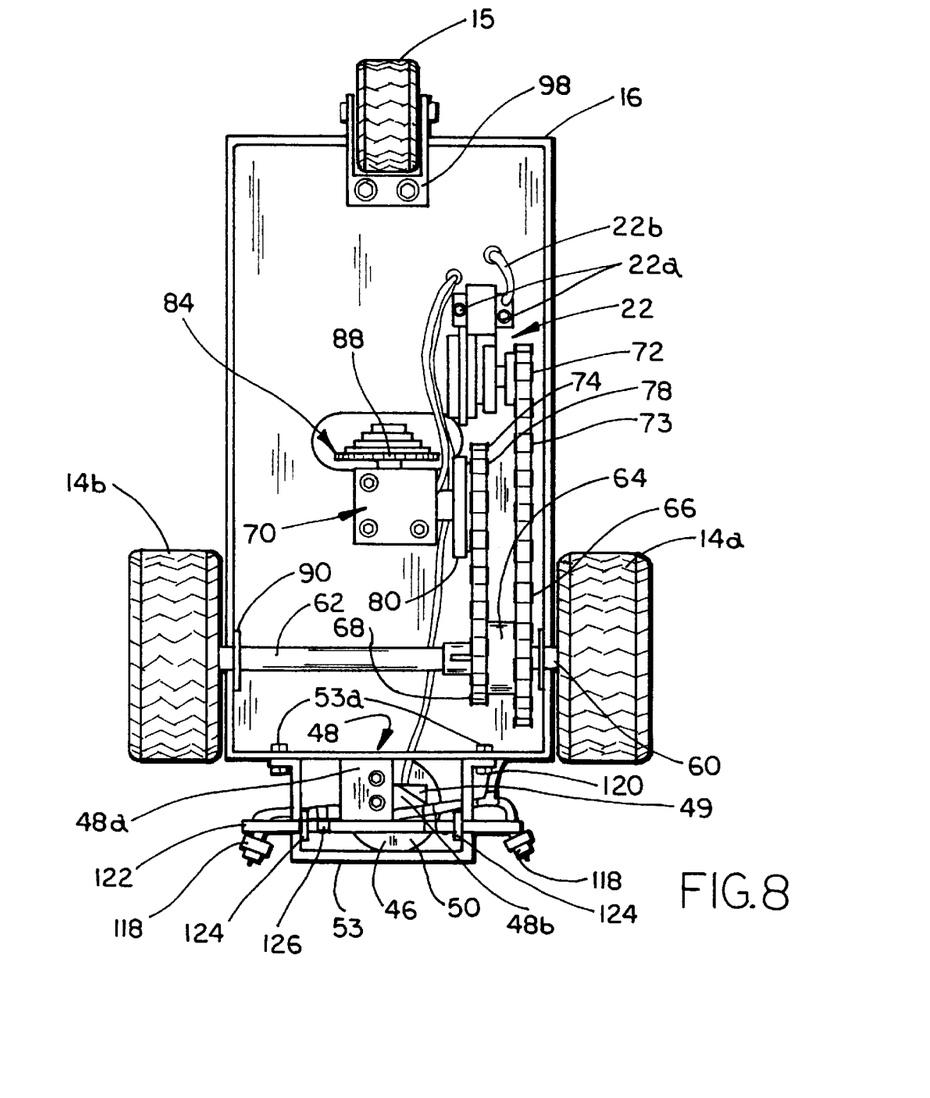
FIG. 8 is a bottom plan view of the motorized spreader.

Drive train 14 includes a pair of driven wheels 14a and 14b. Wheels 14a and 14b are driven by a motor 22 (FIG. 6), which is powered by an engine 24. Motor 22 is preferably a hydraulic motor, for example, a hydraulic motor and a hydraulic pump 23 commercially available from Fluid Power Engineering, Inc. in Schoolcraft, Mich. Motor 22 is mounted to the underside of base 16 in a conventional manner, for example by mounting bolts 22a (FIG. 8). Hydraulic fluid is supplied to motor 22 from pump 23 through a conduit 22b that extends from hydraulic pump 23, which is supported on the upper side of base 16, through an opening in base to motor 22 (FIG. 3). Engine 24 is preferably a gas powered engine, for example a 5.5 horsepower horizontal engine, model GX160KAQAX available from Honda, which runs on gas supplied from gas tank 24a, which is mounted to the engine 24, and is started by a pull cord (not shown). An alternator 25 is also provided to supply ac current to a 12-volt battery 16a, which is supported and secured on the upper side of base 16 by a conventional battery support (not shown). Both the engine 24 and alternator 25 are mounted on the top surface of base 16 by conventional methods, for example a plurality of mounting bolts (not shown). Furthermore, engine 24 is controlled by twist throttle handle 19a and a throttle control cable 24a, which extends from handle 19a to engine 24. Preferably, handle 19a includes a twist throttle available from Rowerdinks, Inc.

Figure 4:
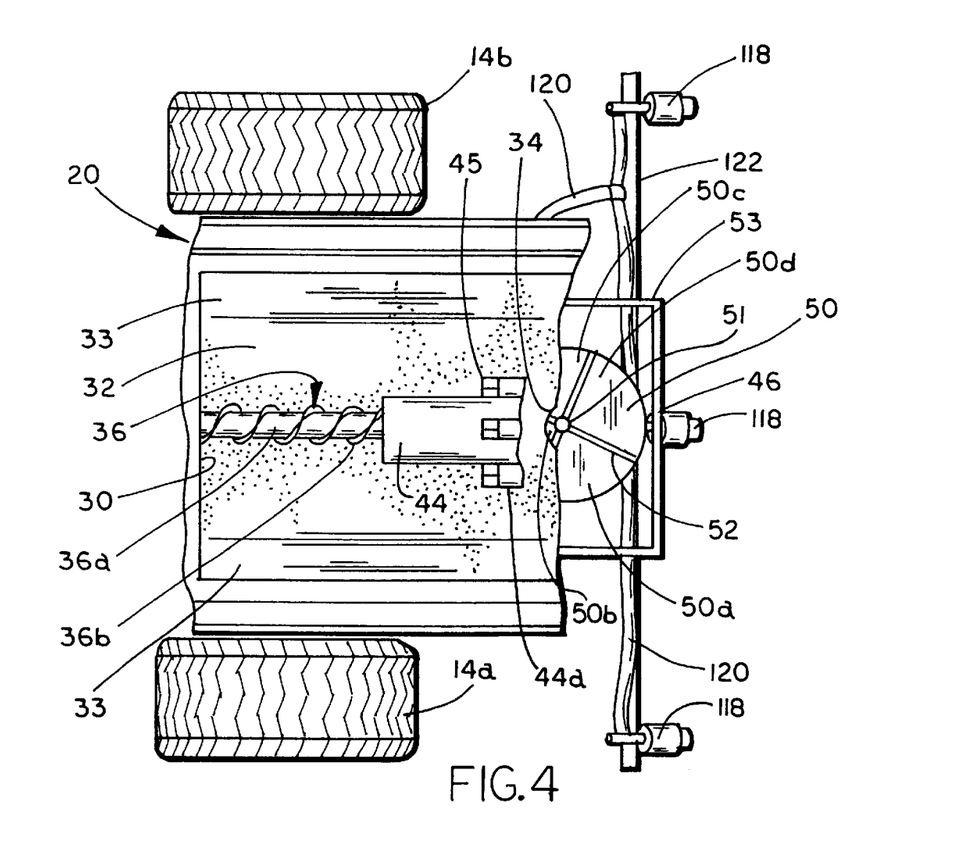
FIG. 4 is an enlarged partial cut away top view of the hopper.

Hopper 20 is generally an inverted wedge shape plastic container with an open top end 30 through which the material is delivered into hopper 20 and a bottom wall 32 having a dispensing opening 34 (FIG. 4) through which the material is dispensed downwardly from hopper 20. Preferably, hopper 20 is a 250 lb. capacity fertilizer hopper, available from Industrial Farm Tank, Inc. in Lewistown, Ohio. Hopper 20 holds the material and directs the flow of the material downward and toward the central portion of bottom wall 32 with sloping side walls 33. Bottom wall 32 includes dispensing opening 34 and a dispensing nozzle 35, which depends from the bottom wall 32 of hopper 20 and directs the flow of the material from dispensing opening 34 onto an impeller 46 that is positioned below nozzle 35, as will be explained below. The flow of the material is directed along bottom wall 32 toward opening 34 by an agitator 36.

Agitator 36 preferably comprises an auger, for example a commercially available auger from John Deere Harvester Works in East Moline, Ill. Auger 36 includes a shaft 36a and a helical rib 36b that extends over a longitudinal extent of the shaft 36a so that when auger 36 is rotated, the material in hopper 20 will move from one end of hopper 20 to the other end of hopper toward opening 34. Auger 36 is preferably supported in hopper 20 by end walls 38 and 40 on bearings 42 (FIG. 7) above bottom wall 32. In this manner, auger 36 is free to rotate about its longitudinal axis and to push the material in hopper 20 from end wall 38 to end wall 40 of hopper 20 toward opening 34. As best seen in FIG. 2, auger 36 extends into a cover/collar 44, which is positioned in hopper 20 above dispensing opening 34. Collar 44 is aligned over opening 34 to cover opening 34 and inhibit the flow of material through opening 34. In this manner, the material is dispensed through opening 34 only when auger 36 is rotating. As shown in FIG. 3, collar 44 is secured to end wall 40 of hopper 20 by a plurality of bolts 45, which extend through elongated bosses 44a provided around the periphery of collar 44.

In operation, when auger 36 is rotated, the material in hopper 20 flows through opening 34 and is directed from hopper 20 by nozzle 35. The material is then dispersed in a radial manner by impeller 46, which is positioned and supported below opening 34 and nozzle 35 on a support 48 and rotated by an impeller motor 49. Impeller 46 comprises a generally circular flat base plate 50 with a downwardly extending shaft 51, which is supported and driven by motor 49. Base plate 50 includes upwardly extending impeller plates 52 that segment base 50 into quadrants 50a, 50b, 50c, 50d onto which the material is directed from nozzle 35. Preferably, motor 49 comprises a 12-volt electric impeller motor available from Rae Corporation in McHenry, Ill. and is powered by battery 16a, which is supported on base 16. Support 48 comprises a bracket 48a, which is welded or bolted or otherwise secured to base 16, and an adjustable mounting plate 48b, which is bolted to bracket 48a. Adjustable mounting plate 48b supports impeller motor 49, which in turn supports impeller 46. As the material is dispensed through opening 34 and nozzle 35, impeller motor 49 rotates impeller 46 so that the material impinges impeller plates 52, which cause the material to be uniformly dispersed in a radial fashion from impeller 46. The range of dispersion varies from about 5 feet to about 10 feet depending on the speed of motor 49. It should be understood that the range of dispersion can be increased or decreased by increasing the size of the motor 49, as desired to accommodate varying applications. Impeller motor 49 is controlled by a conventional resistive toggle switch 82a that is provided on control panel 82. The position of the switch 82a varies the resistance across the switch and, therefore, varies the amount of current that is directed from battery 16a to motor 49, which determines the speed of motor 49 and the area of coverage. As best seen in FIGS. 1, 3 and 8, impeller 46 is protected by an impeller guard 53. Impeller guard 53 is a generally U-shaped frame that surrounds impeller 46 so that impeller 46 is not inadvertently knocked when the operator of spreader 10 approaches trees or shrubs or other obstacles too closely. Impeller guard 53 is secured to the forward end of base 16 by a plurality of bolts 53a. Furthermore, as will be explained in more detail in reference to spray system 21, impeller guard 53 provides support for several of the spray system components.

Figure 7:
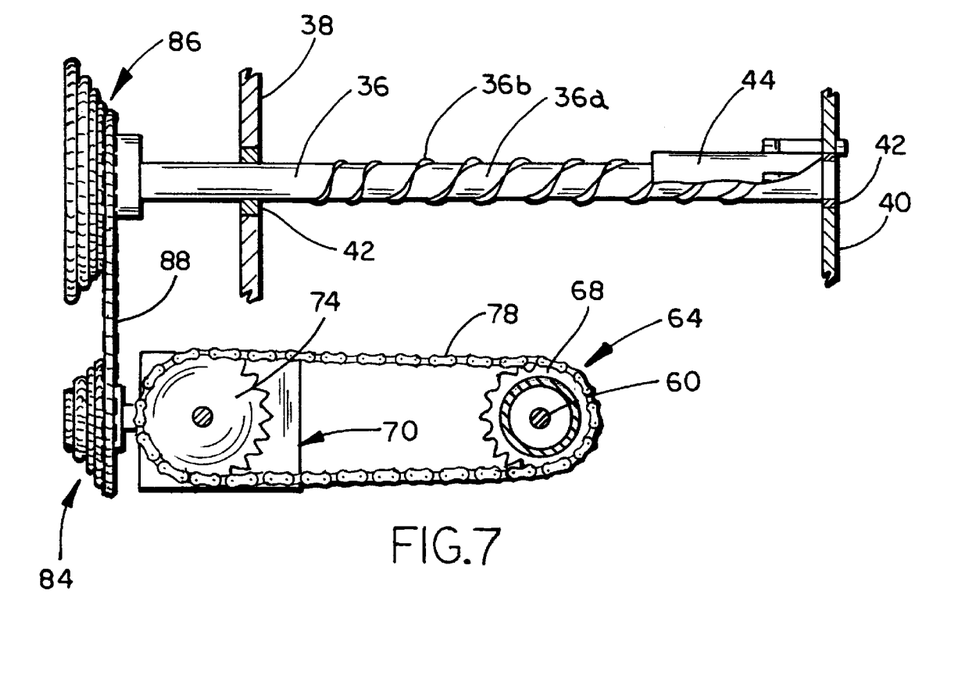
FIG. 7 is a cross-sectional view taken along line VII—VII of FIG. 6.

As described previously, auger 36 is driven by drive train 14. Referring to FIG. 7, auger 36 projects exteriorly of end wall 38 of hopper 20 to couple to drive train 14 so that when spreader 10 is moving, auger 36 rotates at a speed that is proportional to the ground speed of spreader 10. Driven wheels 14a and 14b of drive train 14 are each mounted to an axle 60 and 62. Axles 60 and 62 are supported by base 16 and are driven by motor 22 through a differential 64, which includes a driven sprocket 66 and a driving sprocket 68. Driven sprocket 66 couples to motor 22 for rotating axles 60 and 62 and, in turn, wheels 14a and 14b. Driving sprocket 68 couples to auger 36 through a gear set/box 70. Differential 64 is preferably a 700-series differential commercially available from Stewart Manufacturing in Springfield, Ohio, and is typically supplied with axles 60 and 62 extending outwardly from the differential. Driven sprocket 66 is coupled to the drive sprocket 72 of motor 22 by an endless chain 73, which extends around sprockets 66 and 72. Driving sprocket 68, on the other hand, is coupled to an input drive sprocket 74 of right angle gear box 70 by an endless chain 78 that extends around sprockets 68 and 74. Gear set/box 70 is preferably a right angle gear box with a 1:1 ratio, clockwise input rotation counter clockwise output rotation, and double extended output shaft, for example, a M-2 right angle gear box commercially available from Euclid Universal Corp. in Bedford, Ohio. Gear box 70 includes an electric clutch 80, so that auger 36 can be selectively disengaged from drive train 14. Electric clutch 80 is preferably a 12-volt high torque spreader clutch, available from Kanematsu USA Inc. in Somerset, N.J., and is powered by battery 16a. Clutch 80 is actuated and controlled by a toggle switch 82b provided on control panel 82. Output drive sprocket 84 of right angle gear box 70 is coupled to a drive sprocket 86 of auger 36 by an endless chain 88 that extends around sprockets 84 and 86. Output drive sprocket 84 is preferably a five speed sprocket, which is available from Riteway Products in St. Louis, Mo. Drive sprocket 86 of auger 36 is also preferably a Shimano five speed sprocket, available from Riteway Products. The two five speed sprockets are oriented in opposite directions so that the auger has five different speeds, which can be varied by changing the position of chain 88 on the two five-speed sprockets.

Figure 5:
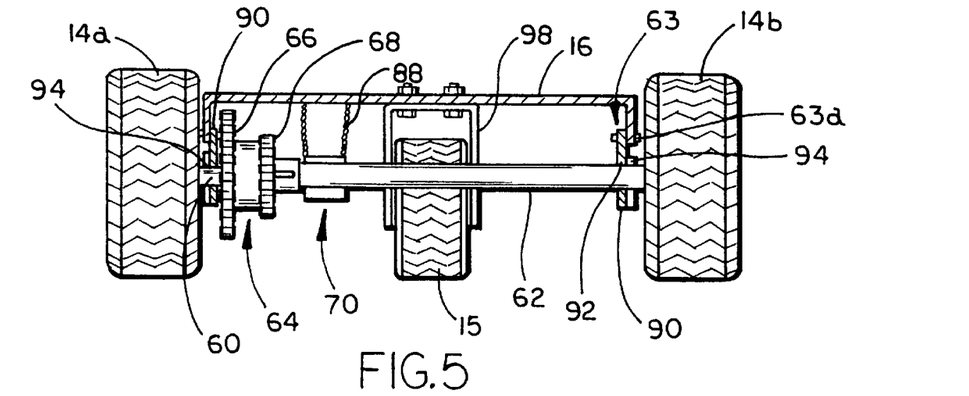
FIG. 5 is a cross-sectional view taken along line V—V of FIG. 2.

Base 16 is supported on axles 60 and 62 by a pair of mounting assemblies 63. As best seen in FIG. 5, each mounting assembly 63 includes a downwardly depending plate member 90, which is bolted to the side of the base 16 by mounting bolts 63a. Each plate member 90 includes a centrally located axle receiving transverse hole 92. Axles 60 and 62 extends through the holes 92 of the respective plate members 90 and are mounted in the transverse holes 92 by bearings 94, which are bolted onto the respective plate members 90. Swivel wheel 15 is mounted to base 16 by a swivel mounting bracket 98, which is bolted or otherwise secured to rearward portion of base 16, so that when spreader 10 is guided through a turn by the operator of the spreader, wheel 15 will provide continuous support to the rearward portion of frame 12.

It should be understood from the foregoing that when motor 22 is powered by engine 24, drive train 14 moves spreader 10 forward at a desired ground speed, as determined by twist throttle handle 19a. Differential 64 transfers the torque from the drive shaft of motor 22 to the respective axles 60 and 62 and transfers torque from drive shaft of motor 22 to auger 36 through right angle gear box 70. In this manner, the rotational speed of auger 36 is directly proportional to the ground speed of the spreader 10 and independent of the wheels' speeds.

Referring to FIG. 3, spray system 21 is provided to direct a fluid, such as water, to the ground surface, which is being treated or seeded or the like. Spray system 21 includes a supply hose 102, which draws fluid from tank 19 through a pump 104. Pump 104 preferably comprises a 60 psi 12-volt water pump, available from Shurflo, Inc. of Elkhart, Ind. Pump 104 is powered by battery 16a and controlled by a toggle switch 82c mounted in control panel 82. Supply hose 102 directs the flow of pressurized fluid from pump 104 to a differential valve 106 and then to a liquid strainer 108. Differential valve 106 controls the pressure of the pumped fluid as it is directed through the supply hose 102 to the strainer 108. Differential valve 106 is preferably a dial-in pressure valve, which is commercially available from Spraying Systems Co. of Wheaton, Ill. If the pressure setting of valve 106 is less than the pressure of the pumped fluid, fluid is diverted back to tank 19 by a return hose 110 to reduce the pressure in the supply hose 102. This injection of pressurized fluid from return hose into tank provides agitation and reduces, if not eliminates, settling in tank 19. The balance of the fluid is then directed by supply hose 102 through strainer 106 to a shut-off valve 112. Shut-off valve 112 is preferably a ball valve, which is commercially available from Spraying Systems Co., and directs the fluid either to a spray gun/wand 114 through a spray hose 116 or to a set of spray nozzles 118 through supply hose sections 120.

As best seen in FIG. 8, supply hose sections 120 are supported on impeller guard 53 by a support member 122. In the illustrated embodiment, support member 122 comprises a pipe member, but it should be understood that support member 122 may comprise other structural members, such as a rod, an elongated bar, or other rigid members. Support member 122 is supported by impeller guard frame 53 by hangers 124, which are bolted, welded, or otherwise secured to guard 53. Hose sections 120 are secured to support member 122 by conventional hose clamps 126 and extend along support member 122 to position nozzles 118 along support member 122 so that the fluid sprayed from nozzles 118 is directed generally downward and outward from spreader 10. Nozzles 114 are coupled to hose sections 120 by conventional hose couplers and may comprise turbo tip nozzles commercially available from Spraying Systems Co.

While the form of the invention has been described in the context of a spreader for dispersing fertilizer, seed, and salt, it should be understood that spreader 10 can also be used in numerous other applications, such as spreading lime insecticides, fungicides, weed killers, granular phosphate, round-up, and broad leaf weed control. This spreader can also be used to spray liquid forms of such materials.

Furthermore while one form of the invention has been shown and described, other forms will now be apparent to those skilled in the art. The embodiment of the invention shown in the drawings is not intended to limit the scope of the invention which is defined by the claims which follow.

I claim the exclusive property or privilege in the embodiments of the invention defined as:

1. A motorized spreader for dispersing granular material onto a ground surface, said motorized spreader comprising:
   a hopper for holding granular material, said hopper having a dispensing opening for directing a flow of granular material downwardly toward the ground surface;
   an agitator positioned in said hopper for urging the granular material in said hopper toward said dispensing opening;
   a drive train supporting said hopper, said drive train having first and second wheels, each wheel including an axle;
   a motor adapted to be powered;
   a differential drivingly coupling said axles of said wheels, said differential including a first drive sprocket and a second drive sprocket, said first drive sprocket coupling to said motor to drive said motorized spreader at a ground speed and coupling to said agitator for rotating said agitator at a rotational speed proportional to the ground speed of the motorized spreader regardless of whether the spreader is moving in a curved or rectilinear path to control the flow of granular material through the dispensing opening of the hopper.

2. A motorized spreader according to claim 1, wherein said hopper includes front and back walls, said agitator rotatably supported by said front and back walls of said hopper.

3. A motorized spreader according to claim 2, further including bearings for supporting said agitator on said walls of said hopper.

4. A motorized spreader according to claim 1, wherein said hopper includes inwardly sloping, spaced apart side walls and a bottom wall supported therebetween, said dispensing opening being located in said bottom wall, said motorized spreader further including an impeller positioned below said dispensing opening for scattering the granular material as the granular flows downwardly from said dispensing opening.

5. A motorized spreader according to claim 1, wherein said agitator is an auger, said auger being rotationally mounted on said hopper and including a shaft and a plurality of spirally extending ribs projecting from said shaft for pushing the granular material toward said dispensing opening when said auger is rotated, said auger being drivingly coupled to a gear set for rotating said auger, said gear set being drivingly coupled to said second drive sprocket.

6. A motorized spreader for dispersing granular onto a ground surface, said motorized spreader comprising:
   a hopper for holding granular material said hopper having a dispensing opening for directing a flow of granular material downwardly toward the ground surface;
   an agitator positioned in said hopper for urging the granular material in said hopper toward said dispensing opening said agitator comprising an auger said auger being rotationally mounted to said hopper and including a shaft and a plurality of spirally extending ribs projecting from said shaft for pushing the granular material toward said dispensing opening when said auger is rotated said auger being drivingly coupled to a gear set for rotating said auger, said gear set being drivingly coupled to said second drive sprocket, and said gear set comprising a right-angle gear set, said-right angle gear set having an input drive sprocket coupled to said second drive sprocket of said differential and an output drive sprocket coupled to said auger by an endless chain;
   a drive train supporting said hopper, said drive train having first and second wheels each wheel including an axle;
   a motor adapted to be powered;
   a differential drivingly coupling said axles of said wheels, said differential including a first drive sprocket and a second drive sprocket, said first drive sprocket coupling to said motor to drive said motorized spreader at a ground speed, said second drive sprocket coupling to said agitator for rotating said agitator whereby the rotational speed of the agitator is proportional to the ground speed of said motorized spreader for regulating the flow of the granular material through said dispensing opening.

7. A motorized spreader according to claim 5, said auger including an auger drive sprocket.

8. A motorized spreader according to claim 7, wherein said auger drive sprocket comprises a multiple speed drive sprocket such that the speed of said auger is variably proportional to the ground speed of the motorized spreader.

9. A motorized spreader according to claim 8, wherein said output drive sprocket comprises a multiple-speed drive sprocket such that said auger speed can be adjusted by changing the position of said endless chain on said multiple-speed drive sprockets of said auger and said gear set.

10. A motorized spreader according to claim 5, further comprising a cover, said cover extending over said dispensing opening, said auger extending under said cover such that the flow of the granular material through said dispensing opening is controlled by said auger.

11. A motorized spreader according to claim 1, said agitator having a distal end and a drive sprocket mounted to said distal end, said second drive sprocket of said differential drivingly coupled to said drive sprocket of said agitator.

12. A motorized spreader according to claim 11, said distal end and said drive sprocket of said agitator extending exteriorly of said hopper for coupling to said second drive sprocket of said differential.

13. A motorized spreader according to claim 1, wherein said motor comprises a hydraulic motor.

14. A motorized spreader comprising:
   a frame;
   a hopper for holding granular material, said hopper being supported by said frame and having a dispensing opening;
   an impeller supported below said dispensing opening, said impeller adapted to be driven for dispersing the granular material as it flows through said dispensing opening;
   an auger positioned in and rotatably supported by said hopper, said auger positioned for urging the granular material in said hopper toward said dispensing opening, said auger having a speed of rotation for controlling the flow of the granular material to and through said dispensing opening;

a pair of wheels mounted to said frame, said wheels each including a drive axle;

a motor supported by said frame and adapted to be powered, said motor having a motor drive sprocket for driving said motorized spreader at a ground speed; and a differential coupling said axles of said wheels, said differential coupled to said motor drive sprocket and coupled to said auger for rotating said auger at a rotational speed proportional to the ground speed of said spreader regardless of whether said spreader moves in a curved or rectilinear path.

15. A motorized spreader comprising:

a frame;

a hopper for holding granular material, said hopper being supported by said frame and having a dispensing opening;

an impeller supported below said dispensing opening, said impeller adapted to be driven for dispersing the granular material as it flows through said dispensing opening;

an auger positioned in and rotatably supported by said hopper, said auger positioned for urging the granular material in said hopper toward said dispensing opening, said auger having a speed of rotation for controlling the flow of the granular material to and through said dispensing opening;

a pair of wheels mounted to said frame said wheels each including a drive axle;

a motor supported by said frame and adapted to be powered said motor having a motor drive sprocket for driving said motorized spreader at a ground speed;

a differential coupling said axles of said wheels said differential coupled to said motor drive sprocket and coupled to said auger for rotating said auger at a rotational speed proportional to the ground speed of said spreader regardless of whether said spreader moves in a curved or rectilinear path; and a gear set, said gear set having an input drive sprocket drivingly coupled to said differential and an output drive sprocket, said auger including an auger drive sprocket, and said auger drive sprocket drivingly coupling to said output drive sprocket.

16. A motorized spreader according to claim 15 wherein said auger drive sprocket comprises a multiple speed drive sprocket such that the rotational speed of said auger is variably proportional to the ground speed of the motorized spreader.

17. A motorized spreader according to claim 14, further comprising a collar, said collar being supported by said hopper and covering said dispensing opening, said auger extending into said collar such that the flow of the granular material through the dispensing opening is controlled by the rotation of said auger.

18. A motorized spreader according to claim 14, further comprising a fluid holding tank and at least one conduit in communication with said tank, said tank for holding a fluid to be dispensed from said motorized spreader through said conduit.

19. A method of controlling the flow of granular material from a motorized spreader, the motorized spreader including: a frame; a hopper supported on the frame for holding granular material, the hopper having a dispensing opening; first and second wheels, each wheel including an axle; and a motor adapted to be powered for driving the axles and wheels, said method comprising the steps of:

rotatably supporting an auger in the hopper of the spreader;

positioning the auger to urge the granular material toward the dispensing opening of the hopper when rotated;

coupling the axles of the wheels with a differential;

coupling the auger to a gear set; and coupling the gear set to the differential so that the auger is rotatably driven at a rotational speed proportional to the ground speed of the vehicle regardless of whether the spreader is moved in a curved or rectilinear path to control the flow of the granular material through the dispensing opening.

20. A method of controlling the flow of granular material according to claim 19, further including the steps of:

covering the dispensing opening with collar; and extending the auger into the collar to thereby further control the flow of the granular material through the dispensing opening.

21. A method of controlling the flow of granular material according to claim 19, further including the step of:

positioning an impeller below the dispensing opening; and driving the impeller at a generally constant speed to disperse the granular material from the motorized spreader in a generally uniform manner as it flows downwardly through the dispensing opening.

22. A motorized spreader for dispersing granular material onto a ground surface, said motorized spreader comprising:

a hopper for holding granular material, said hopper having a dispensing opening for directing the flow of granular material downwardly toward the ground surface;

an agitator conditioned in said hopper for urging the granular material in said hopper toward said dispensing opening;

a drive train supporting said hopper, said drive train having first and second wheels, each of said wheels including an axle;

a motor being adapted to be powered; and a differential drivingly coupled said axles of said wheels, said differential coupling to said motor and coupling to said agitator for rotating said agitator whereby the rotational speed of said agitator is proportional to the ground speed of said motorized spreader for regulating the flow of granular material through said dispensing opening regardless of whether said motorized spreader is driven in a curved or rectilinear path.

23. A motorized spreader according to claim 22, wherein said agitator comprises an auger, said auger being rotationally mounted in said hopper.

24. A motorized spreader according to claim 22, further comprising a right-angle gear set, said right-angle gear set having an input drive sprocket coupled to said differential and an output drive sprocket coupled to said auger.

25. A motorized spreader according to claim 22, wherein said differential includes a first drive sprocket and a second drive sprocket, said first drive sprocket coupling to said motor to drive said motorized spreader at a ground speed, said second drive sprocket coupling to said agitator for rotating said agitator whereby the rotational speed of said agitator is proportion to the ground speed of said motorized spreader for regulating the flow of granular material through said dispensing opening.

* * * * *

UNITED STATES PATENT AND TRADEMARK OFFICE
CERTIFICATE OF CORRECTION

PATENT NO. : 5,860,604
DATED : January 19, 1999
INVENTOR(S) : Kooiker

It is certified that error appears in the above-identified patent and that said Letters Patent is hereby corrected as shown below:

Column 7, line 63, after "granular" insert --material--.

Column 8, line 9, after "auger" delete rest of paragraph.

Column 8, line 9, insert ";" after --auger--.

Column 8, line 20, after "powered;" insert --and--.

Column 8, line 25, after "speed," insert --said gear set being drivingly coupled to s  second drive, sprocket, and said gear set comprising a right-angle gear set, said right-angle gear set having an input drive sprocket coupled to said second drive sprocket of said differential and an output drive sprocket coupled to said auger l an endless chain,--.

Column 10, line 35, delete "conditioned" and insert --positioned--.

Column 10, line 63, delete "proportion" and insert --proportional--.

Signed and Sealed this

Fifteenth Day of June, 1999

Attest:

Q. TODD DICKINSON

Attesting Officer

Acting Commissioner of Patents and Trademarks